S. Q. HARPER.
TWO-ROW ATTACHMENT FOR FERTILIZER DISTRIBUTERS.
APPLICATION FILED APR. 10, 1914.
1,157,532.
Patented Oct. 19, 1915.
2 SHEETS—SHEET 1.
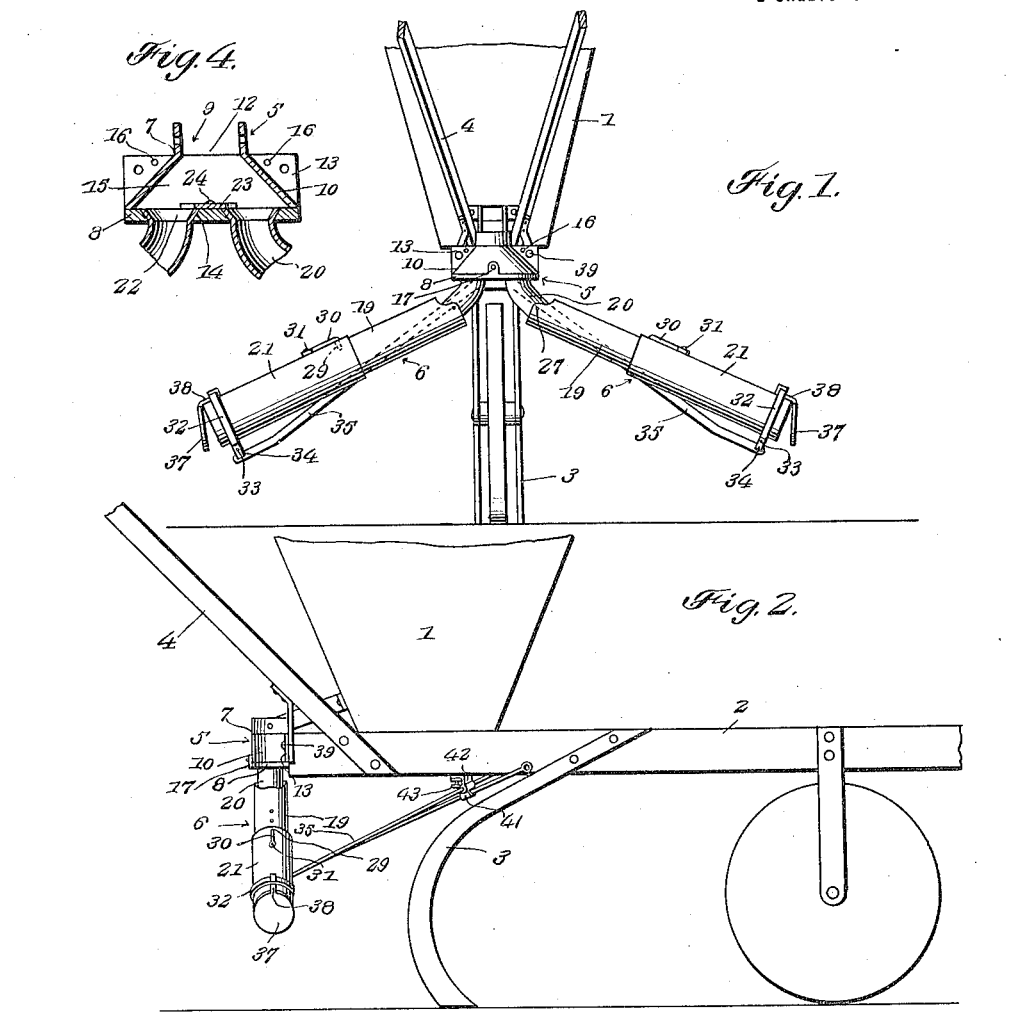
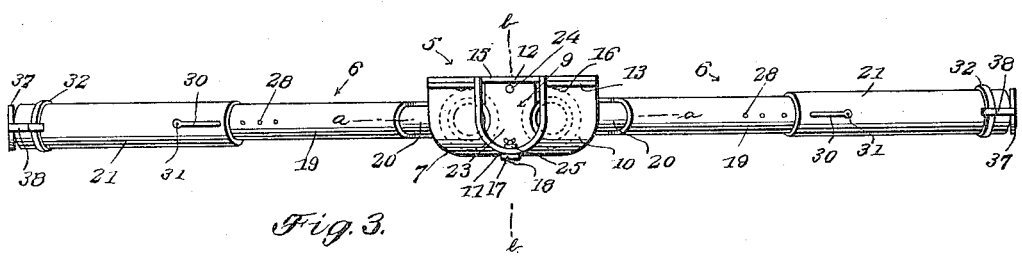
Inventor
S. Q. Harper,
Witnesses
J. H. Crawford
J. W. Garner
By Victor J. Evans
Attorney

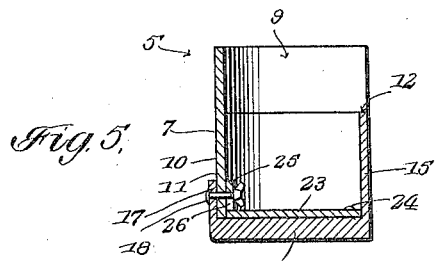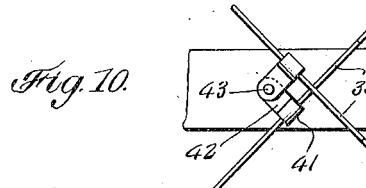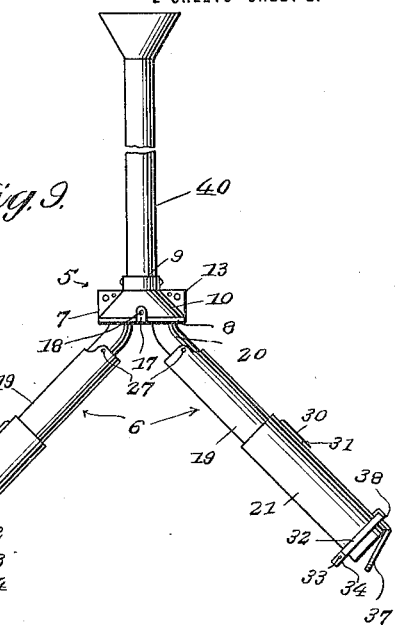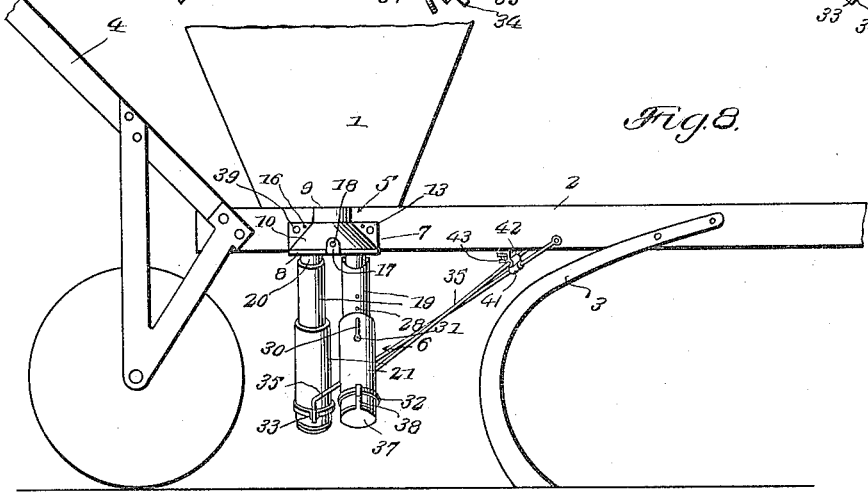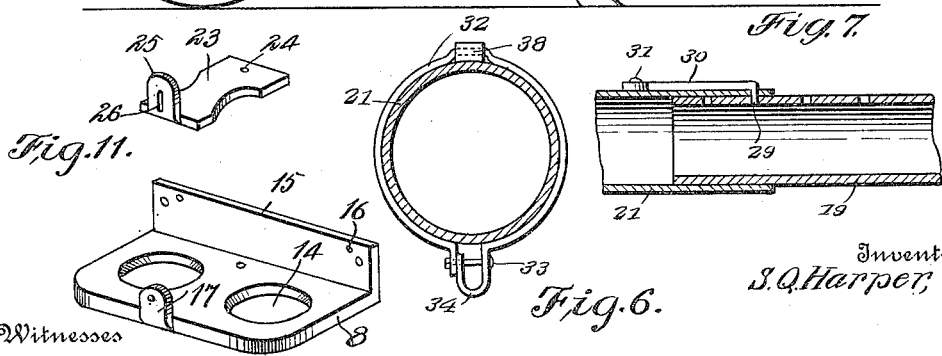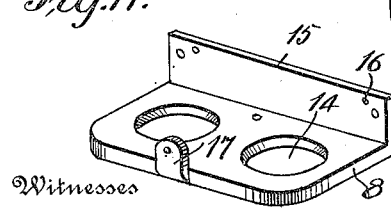

UNITED STATES PATENT OFFICE.

SYLVESTER Q. HARPER, OF FAYETTEVILLE, GEORGIA.

TWO-ROW ATTACHMENT FOR FERTILIZER-DISTRIBUTERS.

1,157,532.  Specification of Letters Patent. Patented Oct. 19, 1915.

Application filed April 10, 1914. Serial No. 831,026.

*To all whom it may concern:*

Be it known that I, SYLVESTER Q. HARPER, a citizen of the United States, residing at Fayetteville, in the county of Fayette and State of Georgia, have invented new and useful Improvements in Two-Row Attachments for Fertilizer-Distributers, of which the following is a specification.

This invention is an improved attachment for use in connection with an ordinary fertilizer distributer to enable the latter to apply fertilizer to two rows of plants at a single operation instead of to only one row as formerly, the object of the invention being to provide an improved attachment of this kind which is cheap and simple, is very strong and durable, which may be readily adjusted to adapt the same for use between rows of varying widths and which may be used in connection with any ordinary plow distributer or hand fertilizer distributing horn, as may be desired.

The invention consists in the construction, combination and arrangement of devices hereinafter described and claimed.

In the accompanying drawings:—Figure 1 is a rear elevation of a two-row attachment constructed in accordance with my invention showing the same in use on the rear end of a common form of plow fertilizer distributer. Fig. 2 is a side elevation of the same. Fig. 3 is a detail plan of the attachment. Fig. 4 is a detail sectional view of the same on the plane indicated by the line $a$—$a$ of Fig. 3. Fig. 5 is a similar view of the same on the plane indicated by the line $b$—$b$ of Fig. 3. Figs. 6 and 7 are detail views. Fig. 8 is a side elevation of my improved two-row attachment, showing the same in use on another common form of plow fertilizer distributer. Fig. 9 is a similar view of the same used in connection with an ordinary hand fertilizer horn. Fig. 10 is an inverted detail plan showing the crossed braces and the fasteners which pivotally secure said braces to the beam. Fig. 11 is a detail perspective view showing the bottom of the head and the clamp, separated.

For the purposes of this specification I show in Fig. 1 of the drawing a plow fertilizer distributer of common form in which the discharge opening of the hopper 1 is on the rear side thereof and at the rear end of the beam 2. The standard which carries the plow or plate is indicated at 3 and the handles at 4.

My improved two-row attachment consists essentially of a head or receiver 5 and a pair of distributing tubes 6. The head 5 comprises a main or body member 7 and a bottom 8. The member 7 has a vertically substantially semi-tubular intake 9 on its upper side into which the fertilizer is discharged from the hopper of the fertilizer distributer to which the device is attached and has a base wall 10 the end portions of which are outwardly and downwardly flared or inclined and the intermediate portion of which is vertical as at 11. This member 7 with its intake 9 and base wall 10 is open on one side as at 12 and its wall 10 is provided at the corners, on the upper side of said member with vertical extensions 13. In practice the member 7 may be struck up or stamped from light sheet iron or other suitable material.

The bottom 8 is made in practice of heavier material than the member 7 and is provided with a pair of openings 14 which are circular and the sides of which are beveled so that said openings are larger at their upper sides than at their lower sides. These openings are arranged near the ends of the bottom and at equal distances from the center thereof so that that portion of the bottom between the said openings is directly under the center of the upper member 7. The bottom extends across the lower side of the wall 10 of the upper member, from side to side and end to end thereof and is formed at one side with an upwardly extending wall 15 which closes the lower portion of the upper member, below the opening 12 and is secured to the extensions 13 by means of suitable rivets 16 or other suitable devices. The bottom is provided at its rear side with a centrally located upwardly extending tab or ear 17 which bears against the rear side of the vertical central portion 11 of the base wall 10 and is secured thereto by means of a set screw 18.

Each distributing tube comprises a main member 19, an elbow 20 at the upper end thereof and an adjustable, lower discharging member 21. The elbows 20 may be made of cast iron or stamped sheet iron as may be preferred and are arranged with their upper ends in the openings 14 of the bottom 8 and provided with outwardly flared flanges 22 which coact with the beveled side of said openings to hold the upper ends of said elbows in said openings and pivotally connect said elbows to the bottom.

To secure the elbows in adjusted position, extending in opposite direction, I provide a clamp 23 which is arranged transversely on the center of the bottom, bears on the opposing upper ends of the elbows, is secured in one end as at 24 and is provided at the opposite end with a lug 25 which bears against the inner side of the vertical portion 11 of the wall 10 and has a vertical adjusting slot 26 into which the set screw 18 extends. When the elbows have been arranged in the desired position the clamp is pressed down on their upper ends to hold them in such position and secured in place by means of set screws, as will be understood.

The members 19—21 of the distributing tubes 6 are preferably made of light sheet iron but may be made of any suitable material. The members 21 are slightly larger than the member 19 and are telescopically fitted thereon so that they may be adjusted in or out according to the width of the space between the plant rows where the fertilizer is to be applied. The main members 19 have their upper ends fitted on the lower portions of the elbows 20 and secured thereto by means of screws 27. The members 19 are provided on their upper sides with spaced adjusting openings 28 which in practice are about two inches apart and each member 21 is provided on its upper side, near its upper end, with a locking stud 29 to engage any of said openings, the said stud being provided with a spring arm 30 which is attached to the member 21 by rivets or other suitable devices 31. It will be understood from the foregoing description that the lower members 21 may be adjusted on the main members 19 longitudinally to make the tubes 6 of any desired length, according to the width of the spaces between the rows.

On each member 21 is a clamping band 32 which extends around the same and is open on the lower side, each clamping band being provided at its open side with a clamping bolt 33 for clamping the band on the member 21 and being also formed with an eye 34 to which is attached one end of a brace 35. The upper ends of the braces may be secured by means of a suitable bolt 36 on opposite sides of the beam 2, said braces serving to secure the distributing tubes 6 in oppositely extended position with reference to the machine on which the attachment is used. The braces are crossed and passed through eyes 41 in fasteners 42, which are pivotally secured to the under side of the beam 2 as at 43. I also provide hoods 37 for use at the outer ends of the lower members 21 of the distributing tube. Each of these hoods is provided at its upper side with an integral hook 38 which bears on the upper side of the member 21 and is engaged by the clamping band 32 and thereby causes to secure the hood in place. The hoods deflect the fertilizer directly downwardly as the same passes out of the lower, discharge ends of the distributing tubes and cause the fertilizer to drop at the required places near the rows of plants.

In Fig. 8 of the drawing my improved two-row attachment is shown in use on another common form of fertilizer distributing plow or machine in which the discharge opening of the hopper is at one side of the beam. When used on this type of machine the head of my improved attachment is secured on the side of the beam instead of on the rear end thereof as shown in Fig. 1. To enable the attachment to be secured to either type of machine the wall portions 13 of the member 7 and flange or wall 15 of the bottom 8 are provided with openings for screws 39 employed to secure the head in place on the beam.

In Fig. 9 of my two-row attachment is shown connected to the lower end of an ordinary hand fertilizer distributer horn 40.

While I have herein shown a preferred form of my invention I would have it understood that changes may be made in the form, and construction of the various parts thereof without departing from the spirit of my invention and within the scope of the appended claims. I would also have it understood that the atachment or any part thereof may be made of any suitable material.

Having thus described my invention, I claim:—

1. A two-row attachment for fertilizer distributers comprising a receiving and dividing head and a pair of distributing tubes leading therefrom and fed thereby, said distributing tubes being longitudinally extensible, and each comprising an elbow member attached directly to the bottom of the head, a main member attached to said elbow member and a lower member telescopically fitted on said main member, said main member having adjusting openings and said lower member having a spring connected stud for engagement with any of said openings.

2. A two-row attachment for fertilizer distributers comprising a receiving and dividing head for atachment to a fertilizer distributer to receive the fertilizer discharged from the hopper a pair of oppositely extending downwardly inclined distributing tubes leading from the bottom of said receiving and dividing head, hoods at the outer ends of said distributing tubes and having hooks bearing thereon, clamping bands around said distributing tubes and co-acting with said hooks to secure the hoods in place and braces for said distributing tubes for attachment to opposite sides of the fertilizer beam, the said braces being connected to said clamping bands.

In testimony whereof I affix my signature in presence of two witnesses.

SYLVESTER Q. HARPER.

Witnesses:
M. L. SEGRAVES,
W. J. STEEL.

Copies of this patent may be obtained for five cents each, by addressing the "Commissioner of Patents, Washington, D. C."